United States Patent [19]

Puippe

[11] Patent Number: 4,840,708
[45] Date of Patent: Jun. 20, 1989

[54] PROCESS FOR THE PRECISE DETERMINATION OF THE SURFACE AREA OF AN ELECTRICALLY CONDUCTING SHAPED BODY

[76] Inventor: Jean-Claude Puippe, Grabenstrasse 7, 8304 Wallisellen, Switzerland

[21] Appl. No.: 844,216

[22] Filed: Mar. 21, 1986

Related U.S. Application Data

[63] Continuation-in-part of Ser. No. 587,192, Mar. 7, 1984, abandoned.

[30] Foreign Application Priority Data

Mar. 11, 1983 [CH] Switzerland ............... 1353/83

[51] Int. Cl.$^4$ ................ G01N 27/26; C25D 21/12
[52] U.S. Cl. ................................ 204/1 T; 204/400
[58] Field of Search ............. 204/1 T, 400; 324/65 R

[56] References Cited

U.S. PATENT DOCUMENTS

| | | | |
|---|---|---|---|
| 3,166,484 | 1/1965 | Hentz | 204/400 X |
| 3,303,109 | 2/1967 | Just | 204/1 T |
| 3,437,568 | 4/1969 | Hasselmann et al. | 204/1 T |
| 3,649,472 | 3/1972 | Morrissey et al. | 204/1 T |
| 4,006,063 | 2/1977 | Ensanian | 204/400 X |
| 4,125,440 | 11/1978 | Markovits | 204/1 T |
| 4,129,480 | 12/1978 | Robert | 204/1 T |
| 4,160,702 | 7/1979 | Baxter | 204/1 T |

FOREIGN PATENT DOCUMENTS

| | | | |
|---|---|---|---|
| 1964354 | 7/1971 | Fed. Rep. of Germany | 204/1 T |
| 2303717 | 8/1974 | Fed. Rep. of Germany | 204/1 T |
| 55-47402 | 4/1980 | Japan. | |
| 56-16068 | 12/1980 | Japan. | |
| 0087802 | 7/1981 | Japan | 204/1 T |
| 617508 | 5/1980 | Switzerland. | |
| 0694563 | 10/1979 | U.S.S.R. | 204/1 T |
| 0883197 | 11/1981 | U.S.S.R. | 204/400 |

OTHER PUBLICATIONS

E. Robert, "Surface Calculation System and Constant Current Density Rectifier", Proceedings of the AES Symposium on Plating in the Electronics Industry, Phoenix, AZ, Jan. 20-21, 1981, pp. 1-12.

Primary Examiner—Nam X. Nguyen
Attorney, Agent, or Firm—Ostrolenk, Faber, Gerb & Soffen

[57] ABSTRACT

The process for the precise determination of the surface area of an electrically conducting shaped body is performed by immersing said body as one electrode in an electrolyte. A steady or variable voltage or a steady or variable electrical current is applied to said electrode externally or internally to the electrochemical cell or is variated or is repeated once or indefinitely or is switched off. The diffusion processes which develop in the steady state or the unsteady state and which occur near to said electrode are monitored. The surface area of the electrically conducting shaped body is calculated by measuring the electrical current or the voltage or the transition time.

22 Claims, 1 Drawing Sheet

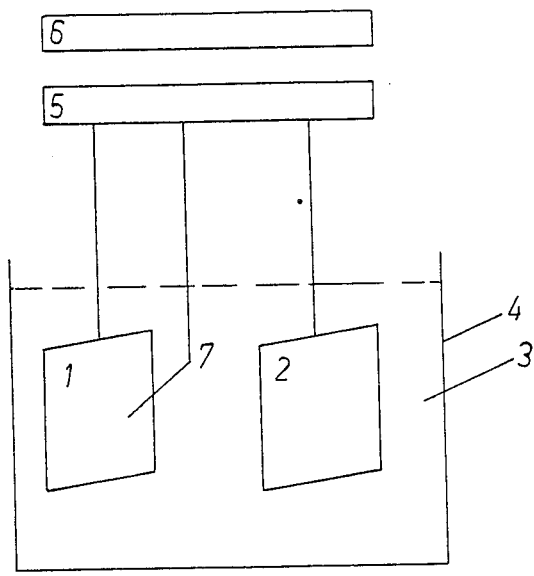

PROCESS FOR THE PRECISE DETERMINATION OF THE SURFACE AREA OF AN ELECTRICALLY CONDUCTING SHAPED BODY

This application is a continuation in part of application Ser. No. 587,192 filed Mar. 7, 1984, abandoned.

The subject matter of the present invention is a process for the precise measurement of the surface area of electrically conducting shaped bodies. Said determination is based on an electrochemical method.

DESCRIPTION OF THE PRIOR ART

Many processes for the determination of the surface area of a shaped body are well known in the art. They are based on geometrical measurements, optical measurements and physico-chemical measurements.

The inventive process is based on an electrochemical determination and, therefore, only the prior art of the determination of surface areas using electrochemical measurements is discussed in detail below.

(a) According to one prior art method the surface area to be determined is submitted to a galvanic zincing and thereafter chromated. The chromate layer is dissolved in a calibrated volume of liquid and in said solution the concentration of chromium is determined using a method of light-absorption. The chromium concentration is then directly proportional with the surface area to be measured and by comparing with a surface of a well known area, said determination of the surface to be measured can be achieved.

(b) Several methods are based on the determination of the capacitive current and/or the charging time or decharging time of an electrical double layer at the electrode. According to one method developed by the company Egatec in Biel (Switzerland), the voltage resulting from the charge of an electrical double layer on the surface of the shaped body, the surface area of which has to be determined, is measured and, furthermore, also the electrical current is measured which is necessary in order to achieve said voltage. With regard to this we refer to the corresponding Swiss patent: CH No. 617 508 A 5 and to the corresponding description enclosed with the apparatus named MIM. In this case the surface to be determined is directly proportional to the electrical current, provided that suitable conditions of current are used. Methods which are based on the capacity of an electrical double layer at an electrode were also developed for the determination of the surface area of porous materials. With regard to this we refer to McCallum J., Walliny J. F., Faust C. L.; Battelle Memorial Inst., Columbus, Ohio, report no.: BATT-7138-Q 1 (Apr. 2, 1965), and McCallum J., Redmond R. F., Faust C. L.; Battelle Memorial Inst., Columbus, Ohio, report no.: BATT-7138-Q 2 (July 2, 1965).

(c) According to a further prior art method the voltage is fixed and the cathodic current determined at said voltage and the surface area of the shaped body is determined using a corresponding calibration curve. This calibration curve should be established before the experiment applying said method to surface areas having a predetermined size. With regard to this we refer to -Uemura C., Japanese Pat. No. 81,160,608 (May 15, 1980). Similar to this method is a method for the measurement of the surface area based on a determination of the anodic current. With regard to this we refer to -Nishikawa Y., Fukakura J., Japanese Pat. No. 80,47,402 (Sept. 30, 1978).

The disadvantages of the above method (a) are the high expenditure of work and the long time required for performing said method which generally is about one hour. A further disadvantage is that said method is based on comparative measurements.

The disadvantages of the above method (b) are mainly the following: The capacity of an electrical double layer at the interface of metal to electrolyte can have an unstable value. Organic materials and small particles of materials can alter the capacity drastically even if they are present only in very small quantities. Furthermore, the capacity is also influenced by electrochemical parameters like the potential difference between the electrodes and the current density.

Also the above stated method (c) has the disadvantage of being a relative measurement which requires the establishing of a calibration curve.

The object of the present invention was to provide an economic process for an accurate and reproducible and absolute measurement of both flat surfaces and not flat surfaces which are not flat. Furthermore, the determination of the surface shall be made without destroying the surface.

Another object of the present invention was to develop a simple method which is not time consuming and does not require a great expenditure of work. A further aim of the present invention was to avoid difficulties which result from the unstable capacity of the double layer and from any comparative processes. Comparative measurements can nevertheless be performed according to said invention if wished by the user.

It was quite unexpectedly found out that the precise measurement of the surface area of an electrically conducting shaped body can be performed based on the diffusion processes which occur if said shaped body is immersed as one electrode into an electrolyte.

The object of the present invention, accordingly, is a process for the precise determination of the surface of an electrically conducting shaped body wherein said shaped body is immersed as one electrode into an electrolyte and wherein a steady or variable voltage or a steady or variable electrical current is applied to said electrode externally or internally to the electrochemical cell or is variated or is repeated indefinitely or is switched off and the diffusion processes, which occur near to said electrode are monitored, which diffusion processes develop in the stationary state or the not stationary state and wherein the surface area to be determined is calculated by measuring the electrical current or the voltage or the transition time.

According to a preferred embodiment of the inventive process, a constant voltage is applied to the electrode, the surface area of which has to be determined, so that a limiting current which is limited by the diffusion, is established and that said limiting current is measured and the surface to be determined calculated according to the equation I $$S = (\delta_N J_L / nFDC) \quad (I)$$

in which equation the symbols have the following meaning:

S is the surface area to be determined
$\delta_N$ is the thickness of the Nernst's diffusion layer
$J_L$ is the limiting current n is the number of charges per ion
F is the Faraday constant
D is the diffusion-coefficient of the species which limits the rate of reaction by diffusion and
C is either the value $c_o - c_e$ if the electrode, the surface of which has to be determined is a cathode, or is the value $c_o - c_s$ if the electrode, the surface area of which has to be determined, is the anode
$c_o$ is the concentration of the electroactive ions inside the solution in an area which is remote from the diffusion layer
$c_e$ is the concentration of the electroactive ions close to the electrode, and
$c_s$ is the saturation concentration of the electroactive ions at the electrode, and wherein, provided that the migration of the electroactive ions contributes to the transport of charges in an amount that cannot be neglected, the value $J_L$ has to be substituted by the value $J_L(1-t_j)$ in which $t_j$ means the transport number of the species j.

According to a further embodiment of the inventive process a constant voltage is applied to the electrode the surface area of which has to be determined, so that the electrochemical reaction immediately proceeds at the limiting current and wherein said limiting current is measured as function of the time and the surface to be determined calculated according to the equation II $$S = \frac{J_L \sqrt{\pi D t}}{nFDC} \quad (II)$$

in which equation the value $\sqrt{\pi D t}$ states the thickness of the diffusion layer at the time t insofar as the diffusion does not interfere with the naturally occurring or forced convection in the vicinity of the electrode, the surface area of which has to be determined and wherein the other symbols have the same meaning as stated above and wherein, provided that the migration of the electroactive ions contribute to the transport of charges in an amount that cannot be neglected, the value $J_L$ has to be replaced by the value $J_L(1-t_j)$, wherein $t_j$ is the transport number of the species j.

According to a further embodiment of the inventive process a constant current is applied which is greater than the limiting current in the steady state and the voltage at the electrode is measured as a function of the time and the transition time is measured and the surface to be determined calculated according to the equation III $$S = \frac{J_L 2\sqrt{D\tau/\pi}}{nFDC} \quad (III)$$

in which equation the value $(2\sqrt{D\tau/\pi})$ states the thickness of the diffusion layer at the transition time $\tau$, which transition time is the time at which $c_e = 0$ or $c_e = c_s$, if the electrode is applied as cathode and as anode respectively and which transition time is characterized by a discontinuity of the voltage wherein, however, the value $(2\sqrt{D\tau/\pi})$ represents the thickness of the diffusion layer at the transition time $\tau$ only so long as the diffusion does not interfere significantly with the naturally occurring or forced convection in the vicinity of the electrode, the surface area of which has to be determined, and wherein said condition is fulfilled if the applied current is sufficiently large and wherein the other symbols have the same meaning as stated above and wherein, provided that the migration of the electroactive ions contributes to the transport of charges in an amount that cannot be neglected, the value $J_L$ has to be replaced by the value $J_L(1-t_j)$ in which $t_j$ means the transport number of the species j.

The claimed process is further disclosed referring to the drawing.

In said drawing the shaped body the surface of which has to be determined, is the working electrode (1) which is immersed in the electrolyte (3), further with the second electrode or counterelectrode (2). The electrolyte is contained in the vessel (4). A stabilized source of voltage (5) or, according to another embodiment, a stabilized source of electrical current (5) is applied to the electrodes and, furthermore, an instrument for measuring the electrical current (6) or, according to an alternative performance, an instrument for measuring the voltage (6). The determined voltage and the determined electrical current are recorded.

The electrodes 1 and 2 are first degreased and, thereafter, immersed into the electrolyte (3) which is contained in the vessel (4). The working electrode (1) is the shaped body, of which the surface area has to be determined and the counterelectrode (2) is an inert electrode, for example a nickel electrode.

According to a preferred embodiment of the inventive process, the oxidation-reduction-reaction of the system Fe (III)/Fe(II) is used for performing said determination. The iron-ions of this system are present in an alkaline electrolyte as ferricyanide and ferrocyanide, together with an excess of the conducting electrolyte, so that the charge-transport of the electroactive ions by migration is negligible.

The concentration of ferrocyanide and ferricyanide in the electrolyte can vary within a very large range of concentration. The concentration of ferrocyanide can be maintained in the range of $10^{-5}$ mol/liter until the saturation concentration and the concentration of ferricyanide correspond to 50% of the concentration of ferrocyanide.

The electrolyte (3) contains an excess of sodium hydroxide.

In an embodiment of the inventive process the working electrode (1), i.e. the shaped body the surface of which has to be determined, is connected as cathode, i.e. as negatively charged electrode, and the counterelectrode (2) is connected as anode, i.e. as positively charged electrode. The reduction of Fe(III) to Fe(II) then occurs on the working electrode (1), i.e. the shaped body the surface of which has to be determined and the oxidation of Fe(II) to Fe(III) occurs on the counterelectrode (2). Preferably the ratio of the surface area of counterelectrode to working electrode should be about 1:1 or have a higher value. If the surface area of the counterelectrode to the working electrode cannot be maintained in said range, then the concentration of the ferrocyanide should be increased correspondingly.

According to said specific embodiment of the claimed process a constant voltage difference of 700 mV is applied between both electrodes (1) and (2) using a stabilized source of voltage (5). The current is measured with the instrument (6) and the change of current as function of the time after the application of voltage is recorded. Within one second several measurements of the current are performed. The surface area of the shaped body (1) is calculated according to the equation II stated before.

Before such a series of determinations of current is repeated, the electrolyte near to the working electrode (1) should be completely restored or recovered. Said process of recovery or restoration can be accelerated by taking the electrode out of and putting it into the solution several times or by moving the electrode or agitating the electrolyte so that it is possible to repeat the determination within one minute.

The inventive process can be performed using a system of two electrodes or, according to the embodiment illustrated in the drawing a system of three electrodes. In this system the third electrode (7) is used as reference electrode, which makes it possible to determine the voltage at the working electrode more accurately or to apply a predetermined voltage to the working electrode more precisely.

Any desired means can be used for agitating the electrolyte.

The inventive process is applicable to aqueous solutions and nonaqueous systems. It, for instance, can be also performed in organic solvents or in a melt of salts. Furthermore, also an electrolyte contained in a gel or an electrolyte contained in any material can be used.

The shaped body of which the surface area has to be determined can be a porous product or a fixed bed.

The inventive process, furthermore, is applicable to electrochemical systems which work applying a laser or ultrasonic waves or any other source of energy.

According to a further preferred embodiment of the claimed process there is used a reduction reaction by which copper ions are converted into elemental copper in an electrolyte with an excess of a conducting electrolyte so that the charge transport of the electroactive ions by migration is negligible.

The inventive process for measuring the surface area is applicable in many fields. It is specially suited for measuring the surface area of shaped bodies having a complicated and irregular shape so that it is not possible to apply geometric methods or optical methods for measuring the surface area.

The inventive process is specially suited in the field of galvanotechnics and electroplating. If for instance the shaped body has to be coated with a coating of a noble metal, then it is important to measure the surface area accurately because of economical reasons. Also technical reasons may necessitate an exact measuring of the surface area, for example if an alloy is electroplated onto a shaped body. In this case the composition of the deposited alloy is dependent from the applied current density.

The inventive process is for instance applicable if said bodies are electroplated by hanging them into the electrolyte or are contained in a barrel.

The inventive process is, furthermore, applicable for measuring the degree of unevenness or roughness of the surface. In said field of application, however, the thickness of the diffusion layer has to be far smaller than the characteristic length of roughness or unevenness. Therefore, the determination should be performed within a limited time.

The following examples further illustrate the inventive process.

EXAMPLE 1

A nickel platelet having the size 50 mm×15 mm which is electrically conducting on both sides, was immersed into an electrolyte, the temperature of which was kept constant at 26° using a thermostat. The composition of the electrolyte was as follows:

| Substance | Concentration in g/l |
|---|---|
| $K_3Fe(CN)_6$ | 3,2926 |
| $K_4Fe(CN)_6$ | 8,4478 |
| NaOH | 20. |

The nickel platelet was connected electrically with the cathode of a potentiostat. As counterelectrode a corresponding nickel platelet having about the same size was used and immersed into the electrolyte equidistant to the first platelet in a distance of 1 to 2 cm. The counterlectrode was electrically connected with the anode of the potentiostate, and said counterelectrode was also used as the reference electrode. A voltage of $-700$ mV with regard to the counterelectrode was applied and maintained constant and the resulting current was measured at the cathode and registered as function of the time. 0,5 seconds after the voltage had been applied, a limiting current of 32,2 mA was measured.

The surface of the nickel platelet was calculated according to the equation II using the following values:

diffusion coefficient $D = 7,47 \cdot 10^{-6}$ cm$^2$/s at a temperature of 26° C.

limiting current $J_L = 32,2 \cdot 10^{-3}$ A time $t = 0,5$ seconds $C = 0,01 \cdot 10^{-3}$ mol/cm$^3$ $F = 96500$ cbs.

$n = 1$

The surface area calculated according to said equation II was 15.3 cm$^2$.

Keeping in mind that also the edge portions of the platelet contribute to its total surface, then the accuracy of the determination is about 99%.

The above stated determination was repeated three times and the reproducibility of the measurement was excellent. Attention has to be paid that the time which elapses between two such measurements is sufficiently long, so that a complete recovery of the diffusion layer at the electrodes is accomplished. The electrodes were moved slightly and the recovery time was about 30 seconds. The complete recovery was achieved, when the voltage between both electrodes had dropped to zero.

EXAMPLE 2

The device was used as in example 1 and also the composition of the electrolyte was as in example 1. When, however, a constant current was applied between both electrodes and when the transition time was reached, a significant jump of the voltage (about 300 mV) was registered.

The measurements were performed applying currents of 20 mA, respectively 25 mA, respectively 40 mA. The transition times measured if the stated amperages were applied, are given in the following table and, furthermore, also the surface areas which were calculated using the equation III.

| J | 20 | 25 | 40 | mA |
|---|---|---|---|---|
| $\tau$ | 3,11 | 2,05 | 0,783 | Sec. |
| S | 15,08 | 15,31 | 15,14 | cm$_2$ |

The accuracy of the measurement was about 99%.

EXAMPLE 3

A stainless steel platelet having the size 100 mm×50 mm, which is electrically conducting on both sides, was immersed into the same electrolyte as given in example 1 at 26° C. As counterelectrode a corresponding stainless steel platelet of the same size as the previous one was used. The electrodes have been connected to a potentiostat as cathode and as anode, respectively. A voltage of −700 mV with regard to the counterelectrode was applied and maintained constant and the resulting current was measured at the cathode 0.5 second after the voltage had been applied. A limiting current of 215.5 mA was measured. The surface area of the stainless steel platelet was calculated according to the equation II using the values given in example 1 for D, C, n and F. The surface area calculated according to said equation II was 101 cm².

EXAMPLE 4

Ten beryllium-brass connector fingers, identical to each other, of a complicated shape and electrically conducting on the whole area, were immersed into an electrolyte containing 10 g/l $CuSO_4 \cdot 5\ H_2O$, 100 g/l $H_2SO_4$ and 0.2 g/l thiourea, maintained at 25° C. As counterelectrode a platelet of platinized titanium of approximatively 1 dm² was used. The connector fingers were connected as a cathode to a potentiostat and the counterelectrode of platinized titanium as an anode. A reference electrode of copper was used and connected to said potentiostat. A voltage of −400 mV with regard to the reference electrode was applied and maintained constant and the resulting current was measured at the cathode 0.5 second after the voltage had been applied. A limiting current of 351.4 mA was measured. The surface area of the ten connector fingers calculated according to equation II with
 $C=0.04 \cdot 10^{-3}$ mol/cm³
 $D=5.65 \cdot 10^{-6}$ cm²/s
 $F=96500$
 $n=2$
was 24 cm², 2.4 cm² each.

EXAMPLE 5

A copper plated printed circuit board was immersed into an electrolyte of the same composition as electrolyte of example 4, maintained at 25° C. A counterelectrode consisting in a platinized titanium grid of about 10 dm² was used. The printed circuit board was connected as a cathode to a potentiostat and the counterelectrode of platinized titanium as an anode. A reference electrode of copper was used and connected to said potentiostat. A voltage of −400 mV with regard to the reference electrode was applied and maintained constant and the resulting current was measured at the cathode 0.5 second after the voltage had been applied. The application of the said voltage and current measurement has been repeated three times with a relaxation time of 28 seconds between two successive measurements and the printed circuit board was not removed from the solution nor agitated between two measurements. The four limiting current readings were 5.26 A, 5.18 A, 5.22 A, 5.19 A with an average value of 5.212 A. The surface area of the printed circuit board calculated according to equation II, with C, D, F and n having the same value as in example 4, was 3.56 dm². By comparison the area of a copper plate of 100 mm×100 mm which is electrically conducting on both sides was measured in the same way and in the same electrolyte and the measured limiting current was 1.45 A.

Various processes which attain the objects of the present invention are described below. These processes may include the processes set forth in the numbered paragraphs below.

(1) A process for obtaining an absolute measurement of the surface area of an electrically conducting shaped body may comprise:
 immersing the shaped body in an electrolyte;
 applying a first electrical signal to the shaped body to cause a diffusion process in the electrolyte near the shaped body which diffusion process is characterized by being diffusion rate limited; and
 measuring a second electrical signal associated with the diffusion process during the period of about the first 3 seconds after the application of the first electrical signal to obtain a measurement of the diffusion process from which the surface area of the shaped body may be determined.

(2) The process of paragraph 1 may be characterized in that the step of applying the first electrical signal comprises applying a constant voltage to the shaped body to establish a limiting current which is proportional to the diffusion rate limited diffusion process. The step of measuring the second electrical signal comprises measuring the limiting current. The process further comprises calculating the surface to be determined from the equation:

$$S = (\delta N J_L / nFDC)$$

in which
 S is the surface area to be determined
 $\delta N$ is the thickness of the Nernst's diffusion layer in the electrolyte;
 $J_L$ is the limiting current;
 n is the number of charges per ion in the electrolyte;
 F is the Faraday constant;
 D is the diffusion-coefficient of a species of ion which limits the rate of reaction by diffusion; and
 C is either the value $c_o - c_e$ if the shaped body is a cathode or is the value $c_o - c_s$ if the shaped body is the anode;
 $c_o$ is the concentration of electroactive ions inside the electrolyte in an area which is remote from the diffusion layer;
 $c_e$ is the concentration of the electroactive ions close to the shaped body; and
 $c_s$ is the saturation concentration of the electroactive ions at the shaped body; and
 wherein, if migration of the electroactive ions contributes to the transport of charges in an amount that cannot be neglected, the value $J_L$ is replaced by the value $J_L (1 - t_j)$ in which $t_j$ is the transport number of a species of the migrating electroactive ions which contributes to the transport of charges.

(3) The process of paragraph 1 may be further characterized in that the step of applying the first electrical signal comprises applying a constant voltage to the shaped body to cause the diffusion process to proceed at a limiting current beginning at a time $t=0$. The step of measuring the second electrical signal comprises measuring the limiting current as a function of time. The process further comprises calculating the surface area of the shaped body according to the equation:

$$S = \frac{J_L \sqrt{\pi D t}}{nFDC}$$

in which the value

D t is the thickness of a diffusion layer at the time t insofar as the diffusion process does not interfere with naturally occurring or forced convection in the vicinity of the shaped body;

S is the surface area to be determined;

$J_L$ is the limiting current;

n is the number of charges per ion in the electrolyte;

F is the Faraday constant;

D is the diffusion-coefficient of a species of ion which limits the rate of reaction by diffusion; and C is either the value $c_o - c_e$ if the shaped body is a cathode or is the value $c_o - c_s$ if the shaped body is the anode;

$c_o$ is the concentration of electroactive ions inside the electrolyte in an area which is remote from the diffusion layer;

$c_e$ is the concentration of the electroactive ions close to the shaped body; and $c_s$ is the saturation concentration of the electroactive ions at the shaped body; and wherein, if migration of the electroactive ions contributes to the transport of charges in an amount that cannot be neglected, the value $J_L$ is replaced by the value $J_L (1-t_j)$ in which $t_j$ is the transport number of a species of the migrating electroactive ions which contributes to the transport of charges.

(4) The process according to paragraph 1 may be further characterized in that the step of applying the first electrical signal comprises applying a constant current greater than a limiting current occurring in a steady state. The step of measuring the second electrical signal comprises measuring the voltage at the shaped body as a function of time and measuring a transition time until a discontinuity in the voltage waveform is noted. The process further comprises calculating the surface area of the shaped body according to the equation:

$$S = \frac{J_L 2 \sqrt{D\tau/\pi}}{nFDC}$$

in which

S is the surface area to be determined;

$J_L$ is the limiting current;

n is the number of charges per ion in the electrolyte;

F is the Faraday constant;

D is the diffusion-coefficient of a species of ion which limits the rate of reaction by diffusion; and C is either the value $c_o - c_e$ if the shaped body is a cathode or is the value $c_o - c_s$ if the shaped body is the anode;

$c_o$ is the concentration of electroactive ions inside the electrolyte in an area which is remote from the diffusion layer;

$c_e$ is the concentration of the electroactive ions close to the shaped body; and $c_s$ is the saturation concentration of the electroactive ions at the shaped body;

$\tau$ is the transition time until the discontinuity in the voltage which occurs when $c_e = 0$ if the shaped body is cathode and occurs when $c_e = c_s$ if the shaped body is an anode; and ($2\sqrt{D\tau/\pi}$ is the thickness of a diffusion layer at the transition time $\tau$ insofar as the diffusion process does not interfere significantly with the naturally occurring or forced convection in the vicinity of the shaped body which occurs if the applied current is sufficiently large; and wherein, if migration of the electroactive ions contributes to the transport of charges in an amount that cannot be neglected, the value $J_L$ is replaced by the value $J_L (1-t_j)$ in which $t_j$ is the transport number of a species of the migrating electroactive ions which contributes to the transport of charges.

(5) The process of paragraph 1 may be further characterized in that the step of applying the first electrical signal comprises applying a constant voltage to the shaped body to cause the diffusion process to proceed at a limiting current beginning at a time $t=0$ and as a function of time. The step of measuring the second electrical signal comprises measuring the slope $\rho$ of the current-time function during the period of about the first 3 seconds after application of the first electrical signal and the process further comprises selecting values for the slope $\rho$ and corresponding time values t for which the product $\rho t^{\frac{1}{2}}$ is a constant function of time. The process further comprises calculating the surface area of the shaped body to obtain the absolute measurement of the surface area thereof according to the equation:

$$S = \frac{2\rho \sqrt{\pi D} \, t^{3/2}}{nFDC}$$

in which $\rho$ is the slope of the measured current-time function and in which the value $\sqrt{\pi D} \, t^{3/2}$ is the thickness of a diffusion layer at a time t insofar as the diffusion process does not interfere with naturally occurring or forced convention in the vicinity of a shaped body.

(6) The process of paragraphs 3, 4 or 5 is also characterized in further comprising carrying out the step of measuring the second signal and calculating the surface area at at least two points of the equation and correlating the results from the different measurements and calculations to assure that the determination of the surface area is based solely on measurements taken during a time when the diffusion process is diffusion rate limited.

(7) A process according to paragraph 3 may be further characterized in that the step of measuring the limiting current as a function of time comprises maintaining the value of $J_L \sqrt{t}$ a constant predetermined value.

(8) The process according to paragraph 4 is also characterized in that measuring the voltage at a shaped body as a function of time comprises obtaining at least two pairs of associated $J_L$ and $\tau$ measurements for which the value of $J_L \sqrt{\tau}$ is a constant predetermined value.

(9) A process according to paragraph 5 may be further characterized in that the step of measuring the second signal comprises obtaining at least two pairs of associated $p$ and $t^{3/2}$ measurements.

(10) A process for determining in absolute terms the surface area of an electrically conducting shaped body may comprise:

immersing the shaped body in an electrolyte which will be controlled to have a diffusion controlled limiting current plateau in the polarization curve;

applying a constant voltage to the shaped body, the value of the voltage being equal to the rest potential of the shaped body, the constant voltage being incrementable by a value $\Delta V$ of about $+/-50$ mV;

monitoring a current that is established in the electrolyte as a function of time for a period which does not exceed about 3 seconds after application of the constant voltage;

altering the constant voltage by the $\Delta V$ value and repeating the step of monitoring the current for the indicated duration;

repeating the steps of applying a constant voltage each time altering the value of the constant voltage by $\Delta V$ with respect to the previous value of the voltage and monitoring the current that is established, the constant voltage being monitored not to exceed $-2$ V or $+2$ V as measured with respect to a standard hydrogen reference electrode;

delaying the application of each subsequent constant voltage by about 30 seconds to permit the voltage at the shaped body to be restored to an initial potential value;

selecting, for each applied constant voltage, corresponding J and t values for which the product $J\sqrt{t}$ is a constant time function;

selecting one of the foregoing $J\sqrt{t}$ time function values which corresponds to the longest time range during which the product $J\sqrt{t}$ is constant; and calculating an absolute value of the surface area of the shaped body according to the equation:

$$S = \frac{J\sqrt{\pi D t}}{nFDC}$$

wherein

S is the surface area to be determined;

J is the selected monitored current;

n is the number of charges per ion in the electrolyte;

F is the Faraday constant;

D is the diffusion-coefficient of a species of ion which limits the rate of reaction by diffusion; and C is either the value $c_o - c_e$ if the shaped body is the cathode or is the value $c_o - c_s$ if the shaped body is the anode;

$c_o$ is the concentration of electroactive ions inside the electrolyte in an area which is remote from the diffusion layer;

$c_e$ is the concentration of the electroactive ions close to the shaped body; and $c_s$ is the saturation concentration of the electroactive ions at the shaped body; and wherein, if migration of the electroactive ions contributes to the transport of charges in an amount that cannot be neglected, the value J is replaced by the value $J(1-t_j)$ in which $t_j$ is the transport number of a species of the migrating electroactive ions which contributes to the transport of charges;

the process further comprising evaluating the surface area of the shaped body by comparison thereof to a surface of known area, the surface area of the shaped body at a given time t being proportional to the measured current selected as shown above.

(11) A process for obtaining an absolute measurement of the surface area of an electrically conducting shaped body may comprise:

immersing the shaped body in an electrolyte which will be controlled to have a diffusion controlled limiting current plateau in the polarization curve;

applying an initial constant current greater than the limiting current which otherwise is established in the electrolyte when a steady state condition is achieved;

measuring the voltage of the shaped body with respect to a reference electrode as a function of time and measuring a transition time which transpires from the application of the constant current to the point when a voltage discontinuity occurs;

applying another constant current which equals the value of the previous constant current incremented by $\Delta J$ as compared to the value of the previous current, $\Delta J$ having a value which is about 1/10 of the value of the initial constant current, if the transition time is longer than 3 seconds;

monitoring the voltage of the shaped body with respect to the reference electrode, as a function of time and obtaining another measurement of the transition time;

repeating the application of constant current to the electrolyte with other current values each of which is incremented by $\Delta J$ with respect to a previous constant current until a transition time if found which is smaller than 3 seconds;

repeating the above application of constant currents but with values of $\Delta J$ which are negative, if the first measured transistion time is smaller than 3 seconds;

repeating the previous measurements with further decremented constant currents until a transition time of about 3 seconds or longer is found;

repeating the application of constant current values, if the initial measured transition time was less than 3 seconds, with constant current values each subsequent one of which is incremented by $\Delta J$;

monitoring the voltage of the shaped body with respect to the reference electrode as a function in time until a discontinuity of the voltage is noted;

repeating the measurement in accordance with the previous step until a transition time which is comparatively much smaller than 3 seconds is obtained; delaying the application of each successive constant current value in the previous steps by a waiting period of about 30 seconds to permit an initial rest potential at the shaped body to be restored;

selecting corresponding values of J and $\tau$ for which the product J $\sqrt{\tau}$ is a constant time function;

calculating the surface area of the shaped body to produce an absolute measurement of surface area according to the equation:

$$S = \frac{J2\sqrt{D\tau/\pi}}{nFDC}$$

where

S is the surface area to be determined;

J is the applied constant current;

n is the number of charges per ion in the electrolyte;

F is the Faraday constant;

D is the diffusion-coefficient of a species of ion which limits the rate of reaction by diffusion; and C is either the value $c_o-c_e$ if the shaped body is a cathode or is the value $c_o-c_s$ if the shaped body is the anode;

$c_o$ is the concentration of electroactive ions inside the electrolyte in an area which is remote from the diffusion layer;

$c_e$ is the concentration of the electroactive ions close to the shaped body; and $c_s$ is the saturation concentration of the electroactive ions at the shaped body;

$\pi$ is the transition time until the discontinuity in the voltage which occurs when $c_e=0$ if the shaped body is cathode and occurs when $c_e=c_s$ if the shaped body is an anode; and ($2\sqrt{D}\tau/\pi$ is the thickness of a diffusion layer at the transition time $\tau$ insofar as the diffusion process does not interfere significantly with the naturally occurring or forced convection in the vicinity of the shaped body which occurs if the applied current is sufficiently large; and wherein, if migration of the electroactive ions contributes to the transport of charges in an amount that cannot be neglected, the value J is replaced by the value J $(1-t_j)$ in which $t_j$ is the transport number of a species of the migrating electroactive ions which contributes to the transport of charges;

the process further comprising evaluating the surface area of a shaped body by comparison thereof to a surface of a known area, the surface area, for a given appied constant current, being proportional to the square root of $\tau$ providing the J and $\tau$ values are selected from the previously selected values of said expression.

(12) A process for obtaining the surface area of an electrically conducting shaped body may comprise:

immersing the shaped body in an electrolyte in which a diffusion controlled limiting current plateau in the polarization curve will be established;

applying a constant voltage to the shaped body, the value of the voltage corresponding approximately to the middle of the polarization curve;

monitoring the current that is established in the electrolyte as a function of time but not for a period longer than the first 3 seconds after application of the constant voltage;

selecting a current value J which is established during a time period of between 0.1 to 0.5 seconds during the first 3 seconds period;

removing the constant voltage from the shaped body and delaying for a period of about 30 seconds to permit the voltage at the shaped body to be restored to an initial potential rest value;

applying a constant current having a value which was selected previously during the 0.1 to 0.5 seconds time range;

monitoring the voltage of the shaped body with respect to a reference electrode as a function of time and noting the transition time that elapses until a voltage discontinuity occurs;

repeating applications of constant currents having values which are sequentially incremented or decremented by a $\Delta J$ current value which comprises about 1/10 of the initial value of the constant current that was applied;

monitoring the voltage to note the transition time $\tau$ for each applied current;

selecting corresponding values of J and $\tau$ for which the product J $\sqrt{\pi}$ is a constant time function;

calculating the surface area of the shaped body to produce an absolute measurement thereof according to the equation:

$$S = \frac{J2\sqrt{D\tau/\pi}}{nFDC}$$

where

S is the surface area to be determined;

J is the applied constant current;

n is the number of charges per ion in the electrolyte;

F is the Faraday constant;

D is the diffusion-coefficient of the species of ion which limits the rate of reaction by diffusion;

C is either the value $c_o-c_e$ if the shaped body is a cathode or is the value $c_o-c_s$ if the shaped body is the anode;

$c_o$ is the concentration of electroactive ions inside the electrolyte in an area which is remote from the diffusion layer;

$c_e$ is the concentration of the electroactive ions located near the shaped body;

$c_s$ is the saturation concentration of the electroactive ions at the shaped body;

$\tau$ is the transition time that transpires before a voltage discontinuity occurs when $c_e=0$ if the shaped body is the cathode or $c_e=c_s$ if the shaped body is an anode ($2\sqrt{D}\tau/\pi$ is the thickness of a diffusion layer at the transition time $\tau$ insofar as the diffusion process does not interfere significantly with the naturally occurring or forced convection in the vicinity of the shaped body which occurs if the applied current is sufficiently large; and wherein, if migration of the electroactive ions contributes to the transport of charges in an amount that cannot be neglected, the value J is replaced by the value J $(1-t_j)$ in which $t_j$ is the transport number of a species of the migrating electroactive ions which contributes to the transport of charges;

evaluating the surface of the shaped body by comparison to a surface of a known area, the surface area for a given applied constant current being proportional to $J\sqrt{\pi}$ providing that $J\sqrt{\pi}$ values are selected from the previously selcted values of these values.

The present invention introduces the concept of a diffusion process which causes an electrical signal to be limited by the diffusion process. Generally what is meant thereby is that the present invention does not refer generally to any process in which a diffusion process takes place but only to those which can be characterized as being "diffusion rate limited". A brief review of the subject matter is presented below.

The present invention relates to a method for obtaining an absolute measurement of the surface area of a shaped body. Several well known methods are available for this purpose including a galvanization method or other methods which measure currents which result from capacitive or charging cycles in an electrolyte. Several of the prior art methods require the measurement of an electrical signal which will provide a physical manifestation of a diffusion process which takes place when the shaped body is immersed into an electrolyte and an electrical field is impressed thereon.

Although the present application focuses on a diffusion method generally, it does so in the presence of a specific environment and teaches how that environment can be established.

The current that is measured in the electrolyte results from the movement of charged particles, in this case mobile ions in the electrolyte. However, ion movement results from several physical forces which include migration, convection and diffusion.

The equations for calculating the surface area provide correct results of surface area only if variations in the measured or monitored electrical signal are attributable to the ion movement that results from diffusion—not from the migration or convection phenomena. This requirement is met when a diffusion is "diffusion rate limited" or in other words when the current is a "diffusion limited current".

The present invention prescribes several methods and conditions which will assure that the above condition is present, enabling an absolute—rather than a relative—calculation of surface area.

In the previously referred to Battelle Reports, it is suggested that a diffusion measurement as described above presents a viable alternative for measurement of surface area. But after setting forth some of the difficulties in applying this principle to the measurements of complex surfaces, the authors do not follow through and merely state that "as time and circumstances permit, attention will be devoted to this technique". The present applicant and the claimed inventions provide the answers now.

It was discovered that the diffusion controlled conditions prevail generally during the first 3 seconds after application of an electrical signal to the shaped body.

The present invention teach specific conditions and various process steps that will provide reliable surface area results relying on a diffusion reaction which is "diffusion rate limited".

The limiting current can be measured advantageously under static current conditions and this is reflected by the application of a corresponding equation which is usable specifically in this instance.

When dynamic current conditions prevail, and a different set of equations is required for determining the surface area.

Various requirements for obtaining true measurements of the surface area using the method of the present invention encompass one or more of the following conditions:

(a) a diffusion rate limited process takes place only during an initial interval of 3 seconds (all claims)

(b) the electrical signal is monitored as a function of time (c) a slope of the electrical signal, rather than the absolute value there is measured.

(d) measurements are repeated, after allowing a relaxation period of about 30 seconds between successive measurements (e) variables such as $J_L$ the square root of t or $J_L$ the square root of $\tau$ are maintained as constant functions of time (f) several measurements and calculations of surface area are effected and results are correlated to one another and to theoretical expected results to assure that a valid diffusion controlled process is achieved.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

I claim:

1. A process for obtaining an absolute measurement of the surface area of an electrically conducting shaped body comprising:

selecting an electrolyte suitable for producing a diffusion controlled limiting current plateau in the polarization curve;

immersing the shaped body in the electrolyte;

applying a first electrical signal to the shaped body to cause a diffusion process in the electrolyte near the shaped body which diffusion process is characterized by being diffusion rate limited; and measuring a second electrical signal associated with the diffusion process and proportionally varying in relation thereto during the period of about the first 3 seconds after the application of the first electrical signal to obtain a measurement of the diffusion process from which the surface area of the shaped body may be determined.

2. The process of claim 1, in which the step of applying the first electrical signal comprises applying a constant voltage to the shaped body to establish a limiting current which is proportional to the diffusion rate limited diffusion process, the step of measuring the second electrical signal comprising measuring the limiting current, the process further comprising calculating the surface to be determined from the equation:

$$S = (\delta N J_L / nFDC)$$

in which

S is the surface area to be determined $\delta N$ is the thickness of the Nernst's diffusion layer in the electrolyte;

$J_L$ is the limiting current;

n is the number of charges per ion in the electrolyte;
F is the Faraday constant;
D is the diffusion-coefficient of a species of ion which limits the rate of reaction by diffusion; and
C is either the value $c_o-c_e$ if the shaped body is a cathode or is the value $c_o-c_s$ if the shaped body is the anode;
$c_o$ is the concentration of electroactive ions inside the electrolyte in an area which is remote from the diffusion layer;
$c_e$ is the concentration of the electroactive ions close to the shaped body; and
$c_s$ is the saturation concentration of the electroactive ions at the shaped body; and
wherein, if migration of the electroactive ion contributes to the transport of charges in an amount that cannot be neglected, the value $J_L$ is replaced by the value $J_L(1-t_j)$ in which $t_j$ is the transport number of a species of the migrating electroactive ions which contributes to the transport of charges.

3. The process of claim 1 in which the step of applying the first electrical signal comprises applying a constant voltage to the shaped body to cause the diffusion process to proceed at a limiting current beginning at a time t=0, the step of measuring the second electrical signal comprising measuring the limiting current as a function of time, the process further comprising calculating the surface area of the shaped body according to the equation:

$$S = \frac{J_L \sqrt{\pi D t}}{nFDC}$$

in which the value $\sqrt{\pi D t}$ is the thickness of a diffusion layer at the time t insofar as the diffusion process does not interfere with naturally occurring or forced convection in the vicinity of the shaped body;
S is the surface area to be determined;
$J_L$ is the limiting current;
n is the number of charges per ion in the electrolyte;
F is the Faraday constant;
D is the diffusion-coefficient of a species of ion which limits the rate of reaction by diffusion; and
C is either the value $c_o-c_e$ if the shaped body is a cathode or is the value $c_o-c_s$ if the shaped body is the anode;
$c_o$ is the concentration of electroactive ions inside the electrolyte in an area which is remote from the diffusion layer;
$c_e$ is the concentration of the electroactive ions close to the shaped body; and
$c_s$ is the saturation concentration of the electroactive ions at the shaped body; and
wherein, if migration of the electroactive ions contributes to the transport of charges in an amount that cannot be neglected, the value $J_L$ is replaced by the value $J_L(1-t_j)$ in which $t_j$ is the transport number of a species of the migrating electroactive ions which contributes to the transport of charges.

4. A process according to claim 1 in which the step of applying the first electrical signal comprises applying a constant current greater than a limiting current occurring in a steady state, the step of measuring the second electrical signal comprising measuring the voltage at the shaped body as a function of time and measuring a transition time until a discontinuity in the voltage waveform is noted, the process further comprising calculating the surface area of the shaped body according to the equation:

$$S = \frac{J_L 2 \sqrt{D\tau/\pi}}{nFDC}$$

in which
S is the surface area to be determined;
$J_L$ is the limiting current;
n is the number of charges per ion in the electrolyte;
F is the Faraday constant;
D is the diffusion-coefficient of a species of ion which limits the rate of reaction by diffusion; and
C is either the value $c_o-c_e$ if the shaped body is a cathode or is the value $c_o-c_s$ if the shaped body is the anode;
$c_o$ is the concentration of electroactive ions inside the electrolyte in an area which is remote from the diffusion layer;
$c_e$ is the concentration of the electroactive ions close to the shaped body; and
$c_s$ is the saturation concentration of the electroactive ions at the shaped body;
$\tau$ is the transition time until the discontinuity in the voltage which occurs when $c_e=0$ if the shaped body is cathode and occurs when $c_e=c_s$ if the shaped body is an anode; and
($2\sqrt{D\tau/\pi}$ is the thickness of a diffusion layer at the transition time $\tau$ insofar as the diffusion process does not interfere significantly with the naturally occurring or forced convection in the vicinity of the shaped body which occurs if the applied current is sufficiently large; and wherein, if migration of the electroactive ions contributes to the transport of charges in an amount that cannot be neglected, the value $J_L$ is replaced by the value $J_L(1-t_j)$ in which $t_j$ is the transport number of a species of the migrating electroactive ions which contributes to the transport of charges.

5. The process according to any one of claims 1-4 further comprising causing an oxidation reduction-reaction of the system Fe (III)/Fe (II), the electrolyte being an alkaline electrolyte comprising ferricyanide and ferrocyanide together with an excess of conducting ions, so that the transport of charges of electroactive ions by migration is negligible, the shaped body being an insoluble electrode.

6. The process of any one of claims 1-4 further comprising causing a reduction reaction in which copper ions are converted into elemental copper, the electrolyte having an excess of a conducting electrolyte so that the charge transport of electroactive ions by migration is negligible.

7. A process according to claim 3 in which the step of measuring the limiting current as a function of time comprises maintaining the value of $J_L\sqrt{t}$ a constant predetermined value.

8. A process according to claim 4 wherein measuring the voltage at a shaped body as a function of time comprises obtaining at least two pairs of associated $J_L$ and $\tau$ measurements for which the value of $J_L\sqrt{\tau}$ is a constant predetermined value.

9. The process of claim 1 in which the step of applying the first electrical signal comprises applying a constant voltage to the shaped body to cause the diffusion process to proceed at a limiting current beginning at a time t=0 and as a function of time, the step of measuring the second electrical signal comprising measuring the slope $\rho$ of the current-time function during the period of about the first 3 seconds after application of the first electrical signal, the process further comprising selecting values for the slope $\rho$ and corresponding time values t for which the product $\rho\ t^{\frac{1}{2}}$ is a constant function of time, the process further comprising calculating the surface area of the shaped body to obtain the absolute measurement of the surface area thereof according to the equation:

$$S = \frac{2\rho \sqrt{\pi D}\ t^{3/2}}{nFDC}$$

in which $\rho$ is the slope of the measured current-time function and in which the value $\sqrt{\pi D}\ t^{3/2}$ is the thickness of a diffusion layer at a time t insofar as the diffusion process does not interfere with naturally occurring or forced convention in the vicinity of a shaped body.

10. The process of claims 3, 4 or 9 further comprising carrying out the step of measuring the second signal and calculating the surface area at at least two points of the equation and correlating the results from the different measurements and calculations to assure that the determination of the surface area is based solely on measurements taken during a time when the diffusion process is diffusion rate limited.

11. A process according to claim 9 wherein the step of measuring the second signal comprises obtaining at least two pairs of associated $\rho$ and $t^{3/2}$ measurements.

12. A process for determining in absolute terms the surface area of an electrically conducting shaped body comprising:

immersing the shaped body in an electrolyte which will be controlled to have a diffusion controlled limiting current plateau in the polarization curve;

applying a constant voltage to the shaped body, the value of the voltage being equal to the rest potential of the shaped body, the constant voltage being incrementable by a value $\Delta V$ of about $+/-$ 50 mV;

monitoring a current that is established in the electrolyte as a function of time for a period which does not exceed about 3 seconds after application of the constant voltage;

altering the constant voltage by the $\Delta V$ value and repeating the step of monitoring the current for the indicated duration;

repeating the steps of applying a constant voltage each time altering the value of the constant voltage by $\Delta V$ with respect to the previous value of the voltage and monitoring the current that is established, the constant voltage being monitored not to exceed $-2$ V or $+2$ V as measured with respect to a standard hydrogen reference electrode;

delaying the application of each subsequent constant voltage by about 30 seconds to permit the voltage at the shaped body to be restored to an initial potential value;

selecting, for each applied constant voltage, corresponding J and t values for which the product $J\sqrt{t}$ is a constant time function;

selecting one of the foregoing $J\sqrt{t}$ time function values which correspond to the longest time range during which the product $J\sqrt{t}$ is constant; and calculating an absolute value of the surface area of the shaped body according to the equation:

$$S = \frac{J\sqrt{\pi Dt}}{nFDC}$$

wherein

S is the surface area to be determined;

J is the selected monitored current;

n is the number of charges per ion in the electrolyte;

F is the Faraday constant;

D is the diffusion-coefficient of a species of ion which limits the rate of reaction by diffusion; and C is either the value $c_o - c_e$ if the shaped body is a cathode or is the value $c_o - c_s$ if the shaped body is the anode;

$c_o$ is the concentration of electroactive ions inside the electrolyte in an area which is remote from the diffusion layer;

$c_e$ is the concentration of the electroactive ions close to the shaped body; and $c_s$ is the saturation concentration of the electroactive ions at the shaped body.

13. A process for obtaining an abosulte measurement of the surface area of an electrically conducting shaped body comprising:

immersing the shaped body in an electrolyte which will be controlled to have a diffusion controlled limiting current plateau in the polarization curve;

applying an initial constant current greater than the limiting current which otherwise is established in the electrolyte when a steady state condition is achieved;

measuring the voltage of the shaped body with respect to a reference electrode as a function of time and measuring a transition time which transpires from the application of the constant current to the point when a voltage discontinuity occurs;

applying another constant current which equals the value of the previous current incremented by $\Delta J$ as compared to the value of the previous current, $\Delta J$ having a value which is about 1/10 of the value of the initial constant current, if the transition time is longer than 3 seconds;

monitoring the voltage of the shaped body with respect to the reference electrode, as a function of time and obtaining another measurement of the transition time;

repeating the application of constant current to the electrolyte with other current values each of which is incremented by $\Delta J$ with respect to a previous constant current until a transition time is found which is smaller than 3 seconds;

repeating the above application of constant currents but with values of $\Delta J$ which are negative, if the first measured transition time is smaller than 3 seconds;

repeating the previous measurements with further decremented constant currents until a transition time of about 3 seconds or longer is found;

repeating the application of constant current values, if the initial measured transition time was less than 3 seconds, with constant current values each subsequent one of which is incremented by $\Delta J$;

monitoring the voltage of the shaped body with respect to the reference electrode as a function in time until a discontinuity of the voltage is noted;

repeating the measurement in accordance with the previous step until a transition time which is in or order of magnitude smaller than 3 seconds is obtained; delaying the application of each successive constant current value in the previous steps by a waiting period of about 30 seconds to permit an initial rest potential at the shaped body to be restored;

selecting corresponding values of J and $\tau$ for which the product $J \sqrt{\tau}$ is a constant time function;

calculating the surface area of the shaped body to produce an absolute measurement of surface area according to the equation:

$$S = \frac{J2\sqrt{D\tau/\pi}}{nFDC}$$

where

S is the surface area to be determined;

J is the applied constant current;

n is the number of charges per ion in the electrolyte;

F is the Faraday constant;

D is the diffusion-coefficient of a species of ion which limits the rate of reaction by diffusion; and C is either the value $c_o - c_e$ if the shaped body is a cathode or is the value $c_o - c_s$ if the shaped body is the anode;

$c_o$ is the concentration of electroactive ions inside the electrolyte in an area which is remote from the diffusion layer;

$c_e$ is the concentration of the electroactive ions close to the shaped body; and $c_s$ is the saturation concentration of the electroactive ions at the shaped body;

$\tau$ is the transition time until the discontinuity in the voltage which occurs when $c_e = 0$ if the shaped body is cathode and occurs when $c_e = c_s$ if the shaped body is an anode; and $(2\sqrt{D\tau/\pi}$ is the thickness of a diffusion layer at the transition time $\tau$ insofar as the diffusion process does not interfere significantly with the naturally occurring or forced convection in the vicinity of the shaped body and wherein, if migration of the electroactive ions contributes to the transport of charges in an amount that cannot be neglected, the value J is replaced by the value $J(1-t_j)$ in which $t_j$ is the transport number of a species of the migrating electroactive ions which contributes to the transport of charges.

14. A process for obtaining the surface area of an electrically conducting shaped body comprising:

immersing the shaped body in an electrolyte in which a diffusion controlled limiting current plateau in the polarization curve will be established;

applying a constant voltage to the shaped body, the value of the voltage corresonding approximately to the middle of the polarization curve;

monitoring the current that is established in the electrolyte as a function of time but not for a period longer than the first 3 seconds after application of the constant voltage;

selecting a current value J which is established during a time period of between 0.1 to 0.5 seconds during the first 3 second period;

removing the constant voltage from the shaped body and delaying for a period of about 30 seconds to permit the voltage at the shaped body to be restored to an initial potential rest value;

applying a constant current having a value which was selected previously during the 0.1 to 0.5 seconds time range;

monitoring the voltage of the shaped body with respect to a reference electrode as a function of time and noting the transition time that elapses until a voltage discontinuity occurs;

repeating applications of constant currents having values which are sequentially incremented or decremented by a $\Delta J$ current value which comprises about 1/10 of the initial value of the constant current that was applied;

monitoring the voltage to note the transition time $\tau$ for each applied current;

selecting corresponding values of J and $\tau$ for which the product $J \sqrt{\tau}$ is a constant time function;

calculating the surface area of the shaped body to produce an absolute measurement thereof according to the equation:

$$S = \frac{J2\sqrt{D\tau/\pi}}{nFDC}$$

where

S is the surface area to be determined;

J is the applied constant current;

n is the number of charges per ion in the electrolyte;

F is the Faraday constant;

D is the diffusion-coefficient of the species of ion which limits the rate of reaction by diffusion;

C is either the value $c_o - c_e$ if the shaped body is a cathode or is the value $c_o - c_s$ if the shaped body is the anode;

$c_o$ is the concentration of electroactive ions inside the electrolyte in an area which is remote from the diffusion layer;

$c_e$ is the concentration of the electroactive ions located near the shaped body;

$c_s$ is the saturation concentration of the electroactive ions at the shaped body;

$\tau$ is the transition time that transpires before a voltage discontinuity occurs when $c_e = 0$ if the shaped body is the cathode or $c_e = c_s$ if the shaped body is an anode $(2\sqrt{\tau/\pi}$ is the thickness of a diffusion layer at the transition time $\pi$ insofar as the diffusion process does not interfere significantly with the naturally occurring or forced convection in the vicinity of the shaped body which occurs if the applied current is sufficiently large; and wherein, if migration of the electroactive ions contributes to the transport of charges in an amount that cannot be neglected, the value J is replaced by the value $J(1-t_j)$ in which $t_j$ is the transport number of a species of the migrating electroactive ions which contributes to the transport of charges.

15. A process for determining the surface area of an electrically conducting shaped body comprising:

selecting an electrolyte suitable for producing a diffusion controlled limiting current plateau in the polarization curve;

immersing the shaped body in the electrolyte;

applying a first electrical signal to the shaped body to cause a diffusion process in the electrolyte near the shaped body which diffusion process is characterized by being diffusion rate limited;

measuring a second electrical signal associated with the diffusion process and proportionally varying in relation thereto during the period of about the first 3 seconds after the application of the first electrical signal to obtain a measurement of the diffusion process from which the surface area of the shaped body may be determined;

comparing the second electrical signal to values obtained from measuring the surface of another shaped body having a known surface area; and determining the surface area of the shaped body on the basis of said comparison.

16. The process of claim 15, in which the step of applying the first electrical signal comprises applying a constant voltage to the shaped body to cause the diffusion process to proceed at a limiting current beginning at a time $t=0$, the step of measuring the second electrical signal comprising measuring the limiting current as a function of time.

17. A process according to claim 15, in which the step of applying the first electrical signal comprises applying a constant current greater than a limiting current occurring in a steady state, the step of measuring the second electrical signal comprising measuring the voltage at the shaped body as a function of time and measuring a transition time until a discontinuity in the voltage waveform is noted.

18. The process of claim 15, in which the step of applying the first electrical signal comprises applying a constant voltage to the shaped body to cause the diffusion process to proceed at a limiting current beginning at a time $t=0$ and as a function of time, the step of measuring the second electrical signal comprising measuring the slope $\rho$ of a current-time function associated with said diffusion process during the period of about the first 3 seconds after application of the first electrical signal, the process further comprising selecting values for the slope $\rho$ and corresponding time values $t$ for which the product $\rho t^{\frac{1}{2}}$ is a constant function of time.

19. A process according to claim 18 wherein the step of measuring the second signal comprises obtaining at least two pairs of associated $\rho$ and $t^{3/2}$ measurements.

20. A process for determining the surface area of an electrically conducting shaped body comprising:

immersing the shaped body in an electrolyte capable of producing a diffusion controlled limiting current plateau in the polarization curve;

applying a constant voltage to the shaped body, the value of the voltage being equal to the rest potential of the shaped body, the constant voltage being incrementable by a value $\Delta V$ of about $+/-$ 50 mV;

monitoring a current that is established in the electrolyte as a function of time for a period which does not exceed about 3 seconds after application of the constant voltage;

altering the constant voltage by the $\Delta V$ value and repeating the step of monitoring the current for the indicated duration;

repeating the steps of applying a constant voltage each time altering the value of the constant voltage by $\Delta V$ with respect to the previous value of the voltage and monitoring the current that is established, the constant voltage being monitored not to exceed $-2$ V or $+2$ V as measured with respect to a standard hydrogen reference electrode; and delaying the application of each subsequent constant voltage by about 30 seconds to permit the voltage at the shaped body to be restored to an initial potential value;

selecting, for each applied constant voltage, corresponding J and t values for which the product $J \sqrt{t}$ is a constant time function;

selecting one of the foregoing $J \sqrt{t}$ time function values which corresponds to the longest time range during which the product $J \sqrt{t}$ is constant; and the process further comprising evaluating the surface area of the shaped body by comparing the above measurements to measurements obtained for a shaped body having a known surface area.

21. A process for determining the surface area of an electrically conducting shaped body comprising:

immersing the shaped body in an electrolyte which will be controlled to have a diffusion controlled limiting current plateau in the polarization curve;

applying an initial constant current greater than the limiting current which otherwise is established in the electrolyte when a steady state condition is achieved;

measuring the voltage of the shaped body with respect to a reference electrode as a function of time and measuring a transition time which transpires from the application of the constant current to the point when a voltage discontinuity occurs;

applying another constant current which equals the value of the previous constant current incremented by $\Delta J$ as compared to the value of the previous current, $\Delta J$ having a value which is about 1/10 of the value of the initial constant current, if the transition time is longer than 3 seconds;

monitoring the voltage of the shaped body with respect to the reference electrode, as a function of time and obtaining another measurement of the transition time;

repeating the application of constant current to the electrolyte with other current values each of which is incremented by $\Delta J$ with respect to a previous constant current until a transition time is found which is smaller than 3 seconds;

repeating the above application of constant currents but with values of $\Delta J$ which are negative, if the first measured transition time is smaller than 3 seconds;

repeating the previous measurements with further decremented constant currents until a transition time of about 3 seconds or longer is found;

repeating the application of constant current values, if the initial measured transition time was less than 3 seconds, with constant current values each subsequent one of which is incremented by $\Delta J$;

monitoring the voltage of the shaped body with respect to the reference electrode as a function in time until a discontinuity of the voltage is noted;

repeating the measurement in accordance with the previous step until a transition time which is an order of magnitude much smaller than 3 seconds is obtained;

delaying the application of each successive constant current value in the previous steps by a waiting period of about 30 seconds to permit an initial rest potential at the shaped body to be restored;

selecting corresponding values of J and $\tau$ for which the product $J \sqrt{\tau}$ is a constant time function; and the process further comprising evaluating the surface area of the shaped body by comparing the above measurements to measurements obtained for a shaped body having a known surface area.

22. A process for determining the surface area of an electrically conducting shaped body comprising:

immersing the shaped body in an electrolyte in which a diffusion controlled limiting current plateau in the polarization curve will be established;

applying a constant voltage to the shaped body, the value of the voltage corresponding approximately to the middle of the polarization curve;

monitoring the current that is established in the electrolyte as a function of time but not for a period longer than the first 3 seconds after application of the constant voltage;

selecting a current value J which is established during a time period of between 0.1 to 0.5 seconds during the first 3 second period;

removing the constant voltage from the shaped body and delaying for a period of about 30 seconds to permit the voltage at the shaped body to be restored to an initial potential rest value;

applying a constant current having a value which was selected previously during the 0.1 to 0.5 seconds time range;

monitoring the voltage of the shaped body with repsect to a reference electrode as a function of time and noting the transition time that elapses until a voltage discontinuity occurs;

repeating applications of constant currents having values which are sequentially incremented or decremented by a $\Delta J$ current value which comprises about 1/10 of the initial value of the constant current that was applied;

monitoring the voltage to note the transition time $\tau$ for each applied current;

selecting corresponding values of J and $\tau$ for which the product $J \sqrt{\tau}$ is a constant time function; and the process further comprising evaluating the surface area of the shaped body by comparing the above measurements to measurements obtained for a shaped body having a known surface area.

* * * * *